(No Model.)

J. L. MAZOYER.
IRONING MACHINE.

No. 352,702. Patented Nov. 16, 1886.

WITNESSES:
C. Neveux
C. Sedgwick

INVENTOR:
J. L. Mazoyer
BY Munn & Co.
ATTORNEYS.

UNITED STATES PATENT OFFICE.

JEAN LOUIS MAZOYER, OF NEW YORK, N. Y.

IRONING-MACHINE.

SPECIFICATION forming part of Letters Patent No. 352,702, dated November 16, 1886.

Application filed June 25, 1885. Serial No. 169,740. (No model.)

*To all whom it may concern:*

Be it known that I, JEAN LOUIS MAZOYER, of the city, county, and State of New York, have invented a new and Improved Ironing-Machine, of which the following is a full, clear, and exact description.

The invention consists in the construction and combination of parts and details, as will be fully set forth hereinafter and claimed.

Reference is to be had to the accompanying drawings, forming part of this specification, in which similar letters of reference indicate corresponding parts in all the figures.

Figure 1:
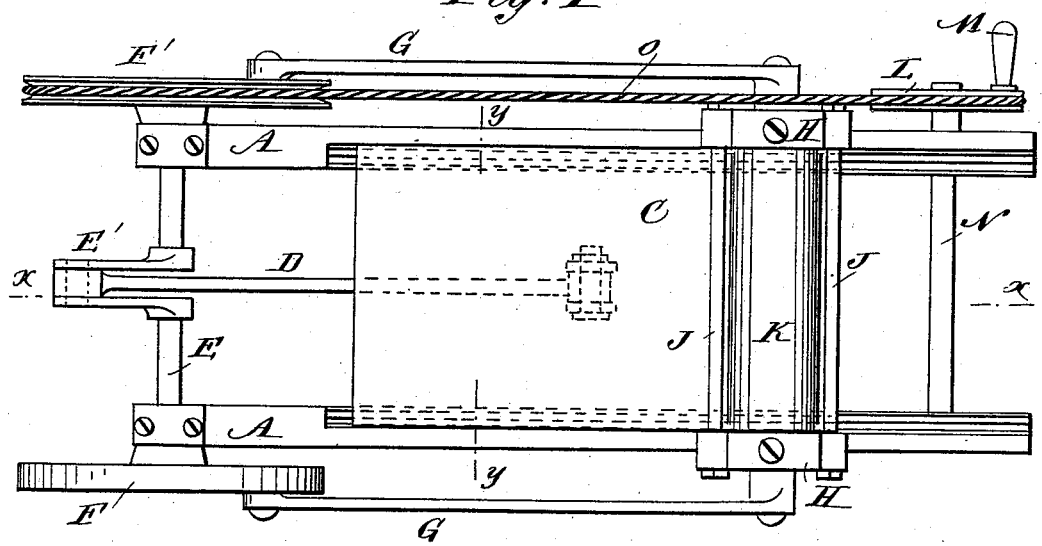
Figure 2:
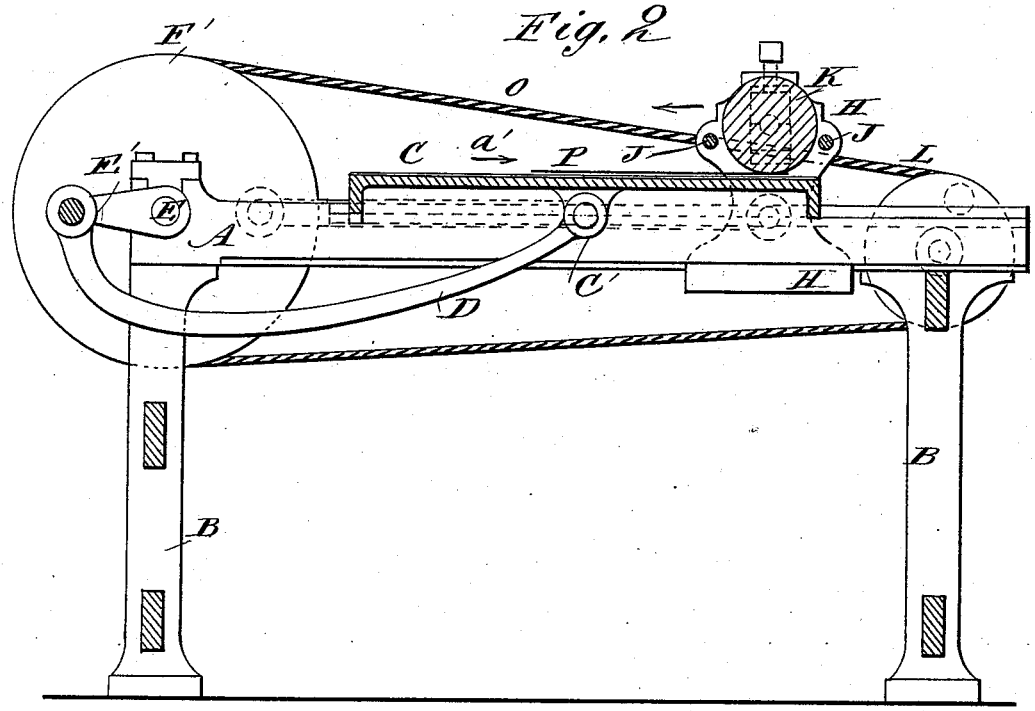
Figure 3:
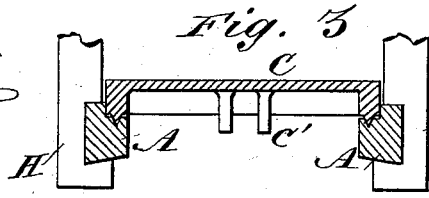

Figure 1 is a plan view of my improved ironing-machine. Fig. 2 is a longitudinal sectional elevation of the same on the line $x\,x$, Fig. 1. Fig. 3 is a cross-sectional elevation of the same on the line $y\,y$, Fig. 1.

The two side bars or tracks, A, are supported by legs B, united in pairs by cross-bars. The top surfaces of the track-bars A are grooved, and in the said grooves the downwardly-projecting side flanges of the ironing-table C run, thus adapting the table to slide forward and back on the tracks. On the under side of the sliding table C lugs C' are formed, between which a connecting-rod, D, is pivoted, the other end of which is pivoted to a crank, E', of a shaft, E, journaled in the track-bars at one end, and having the plain pulley F mounted on one end and the grooved rim pulley F' on the other end, and both said pulleys are connected by rods G with bearings H, mounted to slide on the track-bars A outside of the side edges of the sliding table C. The said sliding bearings H are united by rods J, and in the bearings an ironing-roller, K, is journaled above the table, and the said roller may be made solid or hollow, so that it can be heated by steam. A grooved pulley, L, provided with a crank-handle, M, is mounted on a shaft, N, and over the said pulley L and the pulley F' the endless driving-belt O is passed.

The operation is as follows: The crank-wheel or pulley L is revolved, and thereby the ironing-board C and the roller K and its bearings H are reciprocated in opposite directions, and the roller K is revolved as it passes over the table. The table and the roller are reciprocated in opposite directions for the reason that the direction in which the crank E' projects from the shaft E is opposite to the direction of the pins on the ends of the connecting-bars G from the shaft E. It is thus evident that when the bars G are moved in one direction the crank E' must be moved in the opposite direction, and as the roller K is connected with the connecting-bars G and the reciprocating table is connected with the crank E', the said reciprocating table and the roller must be moved or reciprocated in opposite directions. If the ends of the bars D and G were on the same side of the shaft E, the reciprocating table and the roller K would move in the same direction, and for the special purpose of avoiding this I have constructed the machine so that the ends of the connecting-bar D and the connecting-bar G are always at opposite sides of the shaft. The article, P, to be ironed is placed upon the table C, and the roller K passes over it in different directions a number of times. As the table as well as the roller reciprocates, the machine operates very rapidly, and can be made much shorter than if only one part were made to reciprocate. Thus one man is enabled to turn the crank-wheel that operates the machine, and with the other hand he can place the articles on the ironing-table and remove them. The machine can also be operated by power.

The table C or the roller K, or both, are covered with woven fabric, felt, &c., and, if desired, the table can be constructed as a steam-chest for receiving steam.

Having thus described my invention, I claim as new and desire to secure by Letters Patent—

1. An ironing-machine provided with a reciprocating table and a reciprocating roller, K, above it, both of which are operated from the same shaft, substantially as herein shown and described.

2. In an ironing-machine, the combination, with a supporting-frame, of a sliding table, a connecting-rod connecting the table with the crank of a shaft, pulleys on the ends of the shaft, sliding bearings, a roller journaled in the same above the sliding table, and connecting-rods for connecting the sliding bearings with pulleys on the ends of the crank-shaft, substantially as herein shown and described.

JEAN LOUIS MAZOYER.

Witnesses:
OSCAR F. GUNZ,
CHARLES NEVEUX.